Patented Aug. 11, 1953

2,648,649

UNITED STATES PATENT OFFICE 2,648,649

ACRYLONITRILE POLYMERS PLASTICIZED WITH AQUEOUS INORGANIC SALT SOLUTIONS

George W. Stanton, Walnut Creek, and Theodore B. Lefferdink and Thomas C. Spence, Concord, Calif., assignors to The Dow Chemical Company, Midland, Mich., a corporation of Delaware No Drawing. Application May 28, 1951, Serial No. 228,758

3 Claims. (Cl. 260—29.6)

This invention relates to plasticized polyacrylonitrile compositions.

Polyacrylonitrile has many properties which favor its use in shaped articles, i. e., in molded, extruded or spun products. This polymer, in common with the copolymers containing 85 per cent or more of acrylonitrile, is highly insoluble in most organic solvents, as is now well known. This presents a serious problem, not only when it is desired to make spun products such as fibers, but also when it is desired to shape the polymer by thermal processes such as molding or extrusion. The high boiling esters, such as the phosphates, phthalates, phthalylglycolates, and adipates, to name but a few, which are commonly employed as plasticizers for other polymers, are without any softening or plasticizing effect on polyacrylonitrile. Some of these agents may contribute temporary plasticity to high acrylonitrile polymers while the mixture is at a high temperature, as in a molding or extrusion operation, but, when the shaped mass is cooled to room temperature the "plasticizer" exudes therefrom almost completely, and the polymeric product is hard and brittle. When it is attempted to mold or extrude such a polymer without a plasticizer the same type of hard, brittle product is obtained, and evidences of thermal decomposition may be seen.

Various special organic solvents have been disclosed as being useful in the wet spinning of polyacrylonitrile. Typical of such solvents, listed in U. S. Patents 2,404,713 to 2,404,728, are dimethyl formamide, dimethyl methoxy-acetamide, N-formyl morpholine, N-formyl hexamethylene imine, and tetramethylene cyclic sulfone. Various lactams and lactones are disclosed for the same purpose in Italian Patents 399,311 and 399,312. Many of these agents lack the extremely low volatility which is desired in plasticizers, especially for plastic compositions which are intended for heat fabrication operations such as molding or extrusion. Others are too expensive to be used wherever they would become a permanent part of the composition, that is, their economic usefulness is limited to those operations in which substantially all of the solvent is or may be recovered, as in wet spinning operations.

There is still a need for a non-volatile and economically practical plasticizer for polyacrylonitrile and for those relatively insoluble copolymers which contain 85 per cent or more of acrylonitrile. It is the principal object of the present invention to provide a composition of matter comprising, as the essential constituents, such a polymeric body rich in acrylonitrile and a non-volatile and economically practical plasticizer therefor. A related object is to provide a means for imparting permanent plasticity to shaped articles made from such high acrylonitrile polymers. Other objects may appear hereinafter.

It has now been found that shaped articles made from polyacrylonitrile can be made permanently plastic by incorporating therein from about 6 to about 20 per cent, based on the weight of the polymer, of a humectant which is itself a potential solvent for polyacrylonitrile. In a preferred embodiment, the humectant is one or a mixture of highly hydrated, hygroscopic metal salts which, in aqueous solutions generally more concentrated than 55 per cent, are solvents for polyacrylonitrile. When polyacrylonitrile articles contain about 6 to 20 per cent, based on the weight of the polymer, of such a humectant they differ controllably in properties, depending on the moisture and salt content, from brittle materials through tough and hard products with high impact strengths to highly elastic, rubber-like articles. These articles retain their ability to exhibit plastic properties, even after brief immersion in water, but prolonged soaking in water or in alcohol or other salt solvent should be avoided. This is no more of a handicap here, however, than in the case of the widely used and economically important regenerated cellulose film, for example, which relies for continued flexibility upon the presence of polyhydric alcoholic humectants (not useful here).

It has been found that, when a polyacrylonitrile article contains 6 to 20 per cent, based on the weight of the polymer, of a salt or mixture of salts whose concentrated solutions are capable of dissolving the polymer, the properties of the article vary in the following manner. When the ratio of salt to water exceeds the minimum concentration at which a solution of that salt, or mixture of salts, will dissolve the polymer, a maximum plasticizing effect is exerted, and as the water content of the article is reduced the article becomes more and more brittle. As the ratio of salt to water in the article approaches the concentration above which a solution of the same salt or salts dissolves the polymer and below which it fails to dissolve the polymer, the article is characterized by rubbery or elastic properties. When the water content is increased, so that the ratio of salt to water in the article represents a concentration too low to dissolve the polymer, the article exhibits plastic properties. For most salts whose solutions are capable of dissolving polyacrylonitrile, the minimum concentration at which solution can be effected at temperatures below 50° C. is commonly between 55 and 60 per cent salt in water. For a practical range of useful properties in a shaped article of a polymer containing at least 85 per cent of acrylonitrile in the polymer molecule, there should be present, then, from 6 to 20 per cent of a salt or mixture of salts whose concentrated aqueous solutions are capable of dissolving the polymer, and an amount of water from about 0.5 to 2 times the weight of salt. The maximum amount of salt which can be used effectively (20 per cent), is limited by the practical necessity to avoid exudation of brine from the shaped article at any useful water content. The minimum amount of salt which will exert a significant plasticizing effect when accompanied by the appropriate amount of water has been found to be 6 per cent of the weight of the polymer.

The improved articles of the present invention may be made in any of several convenient ways. Thus, previously manufactured moldings, extrusions, filaments and the like, composed chiefly of polyacrylonitrile, may be soaked in aqueous solutions of hygroscopic salts which are potential solvents for the polymer, until the article has absorbed from 6 to 20 per cent of the salt. They may then be dried to the desired moisture content. More conveniently, films, filaments or other shaped articles may be cast or spun from aqueous saline solutions of the polymer, then coagulated in water or a brine at non-solvent concentrations, stretched to effect orientation, if appropriate to the intended article, and dried to the required moisture content while still retaining 6 to 20 per cent salt.

It is also convenient, when making moldings or extrusions from the polymers here concerned to mix the polymer with from 6 to 20 per cent of its weight of the hygroscopic salt, cause the mixture to become at least partially hydrated, and molding or extruding the mixture. The resultant shaped product may be modified thereafter by immersion in water, to extract some of the salt, or in a strong solution of the salt to introduce more of the humectant or to introduce more water into the article in the manner previously described.

Single salts which may be used for the present purpose are those whose anions are at least as high in the following table as are their cations. Strong aqueous solutions of such salts are solvents for polyacrylonitrile. Mixtures of salts which may be used in the present invention are composed generally of from 30 to 50 parts by weight of such a "solvent" salt and a lesser amount, from 5 to 25 parts of a "non-solvent" salt, i. e., one whose anion is lower in the table than its cation. Such mixtures may be considered "potential solvents" since, when dissolved at an aggregate concentration of 55 to 60 per cent in water, they can dissolve polyacrylonitrile, usually at temperatures which need not exceed 45° to 50° C.

TABLE

*Lyotropic series for polyacrylonitrile*

| Cations in Increasing Order of Effectiveness | Anions in Decreasing Order of Effectiveness |
|---|---|
| $K^+$<br>$Fe^{+++}$<br>$Pb^{++}$<br>$NH_4^+$<br>$Cd^{++}$<br>$Al^{+++}$ | $SCN^-$ |
| $Na^+$<br>$Ba^{++}$<br>$Ca^{++}$ | $I^-$ |
| $Li^+$<br>$Mg^{++}$<br>$Ga^{+++}$ | $Br^-$ |
| $Sb^{+++}$<br>$In^{+++}$<br>$Tl^{+++}$<br>$Sn^{++++}$<br>$Zn^{++}$ | $Cl^-$ |
| $Ag^+$<br>$Ni^{++}$<br>$Co^{++}$<br>$Mn^{++}$ | $NO_3^-$ |
|  | $SO_4^=$ |

The following description of the above table is found in our concurrently filed application, Serial No. 228,751. Of the cations listed, potassium and ferric salts are the least effective solvents, regardless of their associated anions, and, of the anions listed, the sulfates are the least effective solvents, regardless of their associated cations. Each listed cation forms a "solvent salt" with the anions at equal or higher levels in the table, and forms non-solvent salts with anions lower in the table. Thus, no sulfate of a tested metal has been found to dissolve the polymer. No nitrate of a metal above the group containing silver and zinc has been found effective. No chloride of a metal above the group containing tin is effective, but the chlorides of antimony, zinc, nickel, cobalt and manganese serve as solvent salts. No bromide of a metal above calcium is a solvent for the polymer, but the water-soluble bromides of the metals below calcium are all solvents. The highly soluble iodides of all metals below sodium and the soluble thiocyanates of all the listed metal cations except the potassium, ferric, and plumbous ions, are "solvents." The materials employed in the present invention, either as "solvent" or as "non-solvent" salts, must be readily soluble in water and the solvent and non-solvent salt constituents of the system must be capable of remaining dissolved when both are present in the same aqueous medium. Thus, silver nitrate cannot be used with any halide or thiocyanate, and no sulfate can be used together with a calcium salt, for example. In the foregoing table, the cations in each group, the groups being divided by horizontal lines, are of approximately equal effectiveness, all members of the groups level with or below the thiocyanate anion forming salts (with anions at the same or higher level in the table) that are better solvents for the polymer than are the corresponding salts of cations in any higher group.

The following table illustrates the properties of polyacrylonitrile articles containing various amounts of saline potential solvents and water.

| Salt Composition | Weight percent of salts in polymer | Weight percent of water in polymer | Property |
|---|---|---|---|
| Zinc chloride | 6 | 1 | Brittle. |
| Do | 6 | 4 | Hard—tough. |
| Sodium thiocyanate, 5 parts by weight<br>Sodium nitrate, 1 part | 12 | 2 | Brittle. |
| Sodium thiocyanate, 5 parts by weight<br>Sodium nitrate, 1 part | 12 | 5 | Tough—flexible. |
| Sodium thiocyanate, 5 parts by weight<br>Sodium nitrate, 1 part | 12 | 8 | Rubbery. |
| Sodium thiocyanate, 5 parts by weight<br>Sodium nitrate, 1 part | 12 | 16 | Plastic. |
| Zinc chloride, 2 parts by weight<br>Calcium chloride, 1 part | 15 | 2 | Brittle. |
| Zinc chloride, 2 parts by weight<br>Calcium chloride, 1 part | 15 | 10 | Soft—rubbery. |
| Zinc chloride, 2 parts by weight<br>Calcium chloride, 1 part | 15 | 20 | Plastic. |
| Zinc chloride, 2 parts by weight<br>Calcium chloride, 1 part | 20 | 3 | Brittle. |
| Zinc chloride, 2 parts by weight<br>Calcium chloride, 1 part | 20 | 30 | Plastic. |
| Zinc chloride, 2 parts by weight<br>Calcium chloride, 1 part | 30 | 4 | Brittle. |
| Zinc chloride, 2 parts by weight<br>Calcium chloride, 1 part | 30 | 40 | Brine exudes. |

Similar results are obtained with other saline potential solvents, whether the polymer is the homopolymer of acrylonitrile or a copolymer containing 85 per cent or more of acrylonitrile in the polymer molecule, the balance being a copolymerized monoethylenically unsaturated compound.

We claim:

1. A composition of matter consisting essentially of (1) a polymer of at least 85 per cent acrylonitrile, any balance being a copolymerized monoethylenically unsaturated compound, (2) from about 6 to 20 per cent, based on the weight of polymer, of a humectant selected from the group consisting of (a) an inorganic, hygroscopic water-soluble metal salt whose anion is at least as high as its cation in the appended lyotropic series of solvents for the polymer, and (b) water-soluble mixtures of from 30 to 50 parts of such salt with from 5 to 25 parts of a salt whose anion is lower in said series than its cation, in proportions to make at least 55 parts by weight, and (3) an amount of water from 0.5 to 2 times the weight of said salt, said lyotropic series being:

| Cations in Increasing Order of Effectiveness | Anions in Decreasing Order of Effectiveness |
|---|---|
| K+<br>Fe+++<br>Pb++<br>NH4+<br>Cd++<br>Al+++ | SCN− |
| Na+<br>Ba++<br>Ca++ | I− |
| Li+<br>Mg++<br>Ga+++<br>Sb+++ | Br− |
| In+++<br>Tl+++<br>Sn++++<br>Zn++ | Cl− |
| Ag+<br>Ni++<br>Co++<br>Mn++ | NO3− |
|  | SO4− |

2. The composition claimed in claim 1, wherein the humectant agent is a mixture of from 30 to 50 parts by weight of zinc chloride and a lesser amount, from 5 to 25 parts by weight, of calcium chloride, in proportions to make at least 55 parts by weight.

3. The composition claimed in claim 1, wherein the humectant agent is a mixture of from 30 to 50 parts by weight of lithium bromide and a lesser amount, from 5 to 25 parts by weight, of calcium chloride, in proportions to make at least 55 parts by weight.

GEORGE W. STANTON.
THEODORE B. LEFFERDINK.
THOMAS C. SPENCE.

References Cited in the file of this patent

UNITED STATES PATENTS

| Number | Name | Date |
|---|---|---|
| 2,140,921 | Rein | Dec. 20, 1938 |
| 2,425,192 | Kropa | Aug. 5, 1947 |